US010299271B2

(12) United States Patent
Martin

(10) Patent No.: US 10,299,271 B2
(45) Date of Patent: May 21, 2019

(54) LTE CARRIER AGGREGATION WITH WIFI

(71) Applicant: SONY CORPORATION, Tokyo (JP)

(72) Inventor: Brian Alexander Martin, Basingstoke (GB)

(73) Assignee: SONY CORPORATION, Tokyo (JP)

(*) Notice: Subject to any disclaimer, the term of this patent is extended or adjusted under 35 U.S.C. 154(b) by 189 days.

(21) Appl. No.: 15/324,249

(22) PCT Filed: Jun. 4, 2015

(86) PCT No.: PCT/EP2015/062524
§ 371 (c)(1),
(2) Date: Jan. 5, 2017

(87) PCT Pub. No.: WO2016/012144
PCT Pub. Date: Jan. 28, 2016

(65) Prior Publication Data
US 2017/0215191 A1 Jul. 27, 2017

(30) Foreign Application Priority Data
Jul. 25, 2014 (EP) .................................... 14178664

(51) Int. Cl.
H04W 72/04 (2009.01)
H04W 72/08 (2009.01)
(Continued)

(52) U.S. Cl.
CPC ......... H04W 72/0453 (2013.01); H04L 5/001 (2013.01); H04L 5/0057 (2013.01);
(Continued)

(58) Field of Classification Search
CPC . H04W 64/00; H04W 52/24; H04W 72/1226; H04L 5/0051; H04L 5/0053; H04L 47/822
See application file for complete search history.

(56) References Cited

U.S. PATENT DOCUMENTS

2009/0005030 A1* 1/2009 Han .................. H04W 48/16
455/423
2011/0110338 A1* 5/2011 Khoryaev ............ G01S 5/0215
370/335
(Continued)

FOREIGN PATENT DOCUMENTS

WO WO 2012/022370 A2 2/2012

OTHER PUBLICATIONS

International Search Report dated Aug. 17, 2015, in PCT/EP2015/062524 filed Jun. 4, 2015.
(Continued)

Primary Examiner — Romani Ohri
(74) Attorney, Agent, or Firm — Xsensus, LLP

(57) ABSTRACT

In a communications device a wireless access interface provides a primary carrier within a first frequency range, forming a primary cell providing a contiguous set of communications resources across the first frequency range. A controller is configured to generate data representing an estimation of a location of a communications device, to detect signals received within one or more predefined candidate channels within a second frequency range different and mutually exclusive from the first frequency range at the estimated location, each of the candidate channels in the second frequency range representing a minimum unit of communications resource. The controller generates, for each of the one or more candidate channels, channel measurement information from the signals detected within the candidate carrier at the estimated location, and transmits the channel measurement information with an indication of the estimated location of the communications device for each of the candidate channels to the infrastructure equipment.

16 Claims, 6 Drawing Sheets

(51) Int. Cl.
*H04L 5/00* (2006.01)
*H04W 76/15* (2018.01)
*H04W 16/14* (2009.01)
*H04W 84/12* (2009.01)

(52) U.S. Cl.
CPC ......... *H04L 5/0098* (2013.01); *H04W 72/085* (2013.01); *H04W 76/15* (2018.02); *H04W 16/14* (2013.01); *H04W 84/12* (2013.01)

(56) References Cited

U.S. PATENT DOCUMENTS

2013/0088973 A1* 4/2013 Yang .................. H04L 5/003 370/241
2013/0088983 A1* 4/2013 Pragada .............. H04W 16/14 370/252

OTHER PUBLICATIONS

3GPP TR 36.805, V2.0.0, Technical Report, "3rd Generation Partnership Project; Technical Specification Group Radio Access Network; Study on Minimization of drive-tests in Next Generation Networks"; (Release 9), (Dec. 2009), 23 pages.

3GPP TS 32.422, V10.12.0, Technical Specification, "3rd Generation Partnership Project; Technical Specification Group Services and System Aspects; Telecommunication management; Subscriber and equipment trace; Trace control and configuration management", (Release 10), (Jun. 2013), 109 pages.

3GPP TS 37.320, V12.2.0, Technical Specification, "3$^{rd}$ Generation Partnership Project; Technical Specification Group Radio Access Network; Universal Terrestrial Radio Access (UTRA) and Evolved Universal Terrestrial Radio Access (E-UTRA); Radio measurement collection for Minimization of Drive Tests (MDT); Overall description; Stage 2", (Release 12), (Sep. 2014), 25 pages.

3GPP TS 25.133, V9.17.0, Technical Specification, "3rd Generation Partnership Project; Technical Specification Group Radio Access Network; Requirements for support of radio resource management (FDD)", (Release 9), (Dec. 2013), 260 pages.

3GPP TS 36.133, V9.18.0,Technical Specification, "3rd Generation Partnership Project; Technical Specification Group Radio Access Network; Evolved Universal Terrestrial Radio Access (E-UTRA); Requirements for support of radio resource management", (Release 9), (Dec. 2013), 525 pages.

Holma et al., "LTE for UMTS OFDMA and SC-FDMA Based Radio Access", System Architecture Based on 3GPP SAE, John Wiley and Sons (2009), 4 pages.

3GPP ETSI TS 136 211, V11.5.0, Technical Specification, "LTE; Evolved Universal Terrestrial Radio Access (E-UTRA); Physical channels and modulation", Release 11, (Jan. 2014), 122 pages.

3GPP TS 36.212. V11.4.0, Technical Specification, "LTE, Evolved Universal Terrestrial Radio Access (E-UTRA); Multiplexing and channel coding", Release 11, (Jan. 2014), 86 pages.

3GPP TS 136 213, V11.6.0, Technical Specification, "LTE; Evolved Universal Terrestrial Radio Access (E-UTRA); Physical Layer Procedures", Release 11, (Mar. 2014), 184 pages.

3GPP TS 136.321, V11.5.0, Technical Specification, "LTE; Evolved Universal Terrestrial Radio Access (E-UTRA); Medium Access Control (MAC) protocol specification", Release 11, (Mar. 2014), 59 pages.

3GPP TS 136.331, V11.7.0, "LTE; Evolved Universal Terrestrial Radio Access (E-UTRA); Radio Resource Control (RRC); Protocol specification", Release 11, (Mar. 2014), 354 pages.

3GPP TSG RAN WG2 Meeting #86, R2-142731, IEEE 802.11 WG, "Reply Liaison on WLAN signal measurements for WLAN/3GPP Radio interworking", (May 19-23, 2014), 3 pages.

3GPP TS 37.320, V12.0.0, Technical Specification, "3rd Generation Partnership Project; Technical Specification Group Radio Access Network; Universal Terrestrial Radio Access (UTRA) and Evolved Universal Terrestrial Radio Access (E-UTRA); Radio measurement collection for Minimization of Drive Tests (MDT); Overall description; Stage 2", Release 12, (Mar. 2014), 23 pages.

3GPP TS 36.214, V11.0.0, Technical Specification, "3$^{rd}$ Generation Partnership Project; Technical Specification Group Radio Access Network; Evolved Universal Terrestrial Radio Access (E-UTRA); Physical layer; Measurements", Release 11, (Sep. 2012), 14 pages.

3GPP TS 36.314, V11.0.0, Technical Specification, "3rd Generation Partnership Project; Technical Specification Group Radio Access Network; Evolved Universal Terrestrial Radio Access (E-UTRA); Layer 2—Measurements", Release 11, (Sep. 2012), 20 pages.

3GPP TS 36.213, V11.0.0, Technical Specification, "3$^{rd}$ Generation Partnership Project; Technical Specification Group Radio Access Network; Evolved Universal Terrestrial Radio Access (E-UTRA); Physical Layer Procedures", Release 11, (Sep. 2012), 143 pages.

* cited by examiner

Illustration of LTE-U and LTE-A carrier aggregation scenario

LTE CARRIER AGGREGATION WITH WIFI

CROSS-REFERENCE TO RELATED APPLICATIONS

The present application is based on PCT filing PCT/EP2015/062524 filed Jun. 4, 2015, and claims priority to European Patent Application 14 178 664.0, filed in the European Patent Office on 25 Jul. 2014, the entire contents of each of which being incorporated herein by reference.

BACKGROUND

Field of Disclosure

The present disclosure relates to mobile communications networks and methods for communicating data using mobile communications networks, infrastructure equipment for mobile communications networks, communications devices for communicating data via mobile communications networks and methods of communicating.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

It is well known in the field of wireless telecommunications for regions of the radio spectrum to be assigned to different mobile network operators (MNO) for their exclusive use through a license. A license typically grants an MNO exclusive use over a number of years of a predefined portion of the radio frequency spectrum in which to deploy a mobile communications network (e.g. GSM, WCDMA/HSPA, LTE/LTE-A). As a result of this approach, an operator has guarantees of no other radio services interfering with the radio resources that have been assigned to the operator, and within the limitations of the license conditions it has exclusive control over what radio technology it deploys in the network. Consequently, a wireless telecommunications system that is primarily designed to operate using radio resources that have been licensed for exclusive use by the wireless telecommunications system can operate with a degree of centralised control and coordination to help make most efficient use of the available radio resources. Such a wireless telecommunication system also manages all the interference internally, based on standard specifications, since the license grants it good immunity from external interference sources. Coexistence of different devices deployed on an MNO's licensed band is managed through conformance to relevant radio standards. Licensed spectrum is today usually assigned to operators via government-organised auctions, but so-called "beauty contests" continue also to be in use.

It is also well known in the field of wireless telecommunications for regions of the available radio spectrum to remain unlicensed. Unlicensed (license exempt) radio spectrum may, at least to some extent, be freely used by a number of different technologies, such as Wi-Fi and Bluetooth and other non-3GPP radio access technologies. Operating parameters for devices using unlicensed spectrum bands are typically stipulated by technical regulatory requirements such as e.g. the FCC Part 15 rule for 2.4 GHz ISM band. Coexistence of different devices deployed on unlicensed band, due to the lack of centralised coordination and control, is usually based on such technical rules and various politeness protocols.

The use of wireless telecommunications system technologies designed for operation on licensed radio spectrum, such as LTE, is becoming more and more prevalent, both in terms of increasing take-up of established uses for wireless telecommunications technologies, and also the introduction of new uses, e.g., in the developing field of machine-type communications (MTC). In order to help provide more bandwidth to support this increased use of wireless telecommunications technologies, it has recently been proposed to use unlicensed radio spectrum resources to support operations on licensed radio spectrum.

However, in contrast to licensed spectrum, unlicensed spectrum can be shared and used among different technologies, or different networks using the same technology, without any coordinated/centralised control, for example to provide protection against interference. As a consequence of this, the use of wireless technologies in unlicensed spectrum can be subject to unpredictable interference and has no guarantees of spectrum resources, i.e. the radio connection takes place on a best effort basis. This means that wireless network technologies, such as LTE, which are generally designed to operate using licensed radio resources, require modified approaches to allow them to efficiently use unlicensed radio resources, and in particular to co-exist reliably and fairly with other radio access technologies that may be simultaneously operating in the unlicensed spectrum band.

Therefore, deploying a mobile radio access technology system primarily designed to operate in licensed spectrum bands (i.e. having exclusive access to, and hence a level of control over, the relevant radio resources) in a manner which is required by operation in unlicensed spectrum bands (i.e. without having exclusive access to at least some of the relevant radio resources), gives rise to new technical challenges.

SUMMARY OF THE DISCLOSURE

According to one example embodiment of the present technique, a communications device comprises a transmitter configured to transmit signals to an infrastructure equipment of the mobile communications network via a wireless access interface in accordance with a first radio access technology, a receiver configured to receive the signals from the infrastructure equipment via the wireless access interface in accordance with the first radio access technology, and a controller for controlling the transmitter and the receiver. The wireless access interface provides a primary carrier within a first frequency range, which forms a primary cell providing a contiguous set of communications resources across the first frequency range. The controller is configured to generate data representing an estimation of a location of the communications device, to detect signals received within one or more predefined candidate channels within a second frequency range which is different to and mutually exclusive from the first frequency range at the estimated location, each of the candidate channels in the second frequency range representing a minimum unit of communications resource. The detected signals within the second frequency range are at least one of signals transmitted by the infrastructure equipment or another communications device in accordance with the first radio access technology or transmitted in accordance with at least one other radio access technology. The controller is configured to generate, for each of the one or more candidate channels, channel measurement information from the signals detected within the candidate carrier at the estimated location, and transmits the channel measurement information with an indication of the estimated location of the communications device for each of the candidate channels to the infrastructure equipment.

According to the present technique, communications device can provide an equivalent of mobile drive tests within a second frequency range, which may be an unlicensed frequency band, providing an indication of channel measurements at an estimated location, which can be used by the mobile communications network to identify one or more component carriers of the second frequency range or a location where there is a lack of availability of a component carrier within the second frequency range. Further respective aspects and features are defined by the appended claims.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DETAILED DESCRIPTION OF THE EMBODIMENTS

Figure 1:
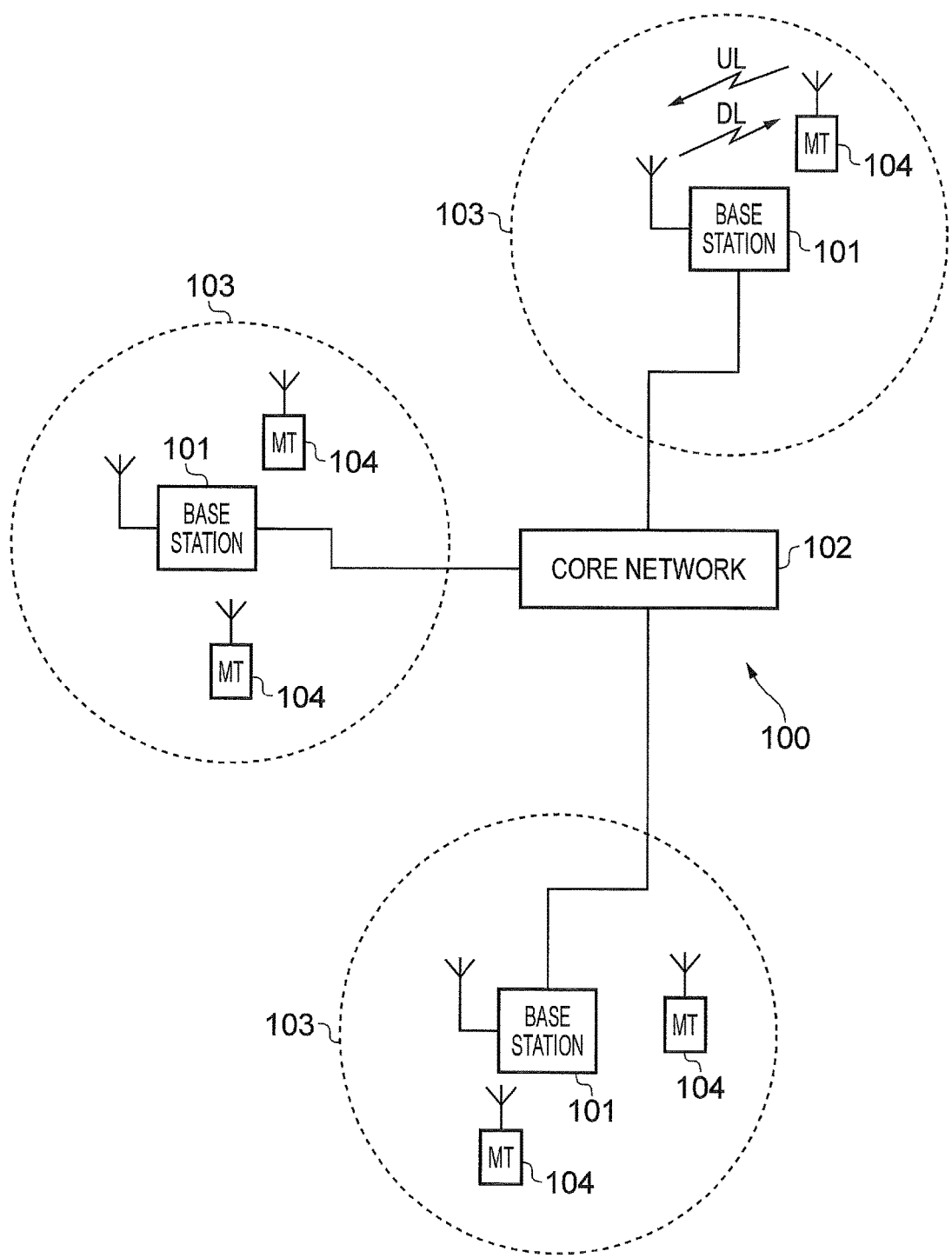
FIG. 1 provides a schematic diagram illustrating an example of a mobile telecommunication system.

FIG. 1 provides a schematic diagram illustrating some basic functionality of a mobile telecommunications network/system 100 operating in accordance with LTE principles and which may be adapted to implement embodiments of the disclosure as described further below. Various elements of FIG. 1 and their respective modes of operation are well-known and defined in the relevant standards administered by the 3GPP® body, and also described in many books on the subject, for example, Holma H. and Toskala A [1]. It will be appreciated that operational aspects of the telecommunications network which are not specifically described below may be implemented in accordance with any known techniques, for example according to the relevant standards.

The network 100 includes a plurality of base stations 101 connected to a core network 102. Each base station provides a coverage area 103 (i.e. a cell) within which data can be communicated to and from communications devices 104. Data is transmitted from base stations 101 to communications devices 104 within their respective coverage areas 103 via a radio downlink. Data is transmitted from communications devices 104 to the base stations 101 via a radio uplink. The uplink and downlink communications are made using radio resources that are licensed for exclusive use by the operator of the network 100. The core network 102 routes data to and from the communications devices 104 via the respective base stations 101 and provides functions such as authentication, mobility management, charging and so on. Communications devices may also be referred to as mobile stations, user equipment (UE), user device, mobile radio, and so forth. Base stations may also be referred to as transceiver stations/NodeBs/eNodeBs, and so forth.

Mobile telecommunications systems such as those arranged in accordance with the 3GPP defined Long Term Evolution (LTE) architecture use an orthogonal frequency division modulation (OFDM) based interface for the radio downlink (so-called OFDMA) and a single carrier frequency division multiple access scheme (SC-FDMA) on the radio uplink.

Using Unlicensed Frequency Band with Licensed Frequency Band

The communications between the base stations 101 and the communications devices 104 are conventionally made using radio resources that have been licensed for exclusive use by the operator of the network 100. These licensed radio resources will be only a portion of the overall radio spectrum. Other devices within the environment of the network 100 may be wirelessly communicating using other radio resources. For example, a different operator's network may be operating within the same geographical region using different radio resources that have been licensed for use by the different operator, while other devices may be operating using other radio resources in an unlicensed radio spectrum band, for example using WiFi or Bluetooth technologies.

As noted above, it has been proposed that a wireless telecommunications network can combine radio resources of a licensed portion of the radio spectrum with radio resources in an unlicensed portion of the radio spectrum. An licensed portion of the radio spectrum is a portion which the wireless telecommunications network does not have exclusive access but rather which is shared by other access technologies and/or other wireless telecommunications networks). In particular, it has been proposed that carrier aggregation based techniques may be used to allow unlicensed radio resources to be used in conjunction with licensed radio resources.

In essence, carrier aggregation allows for communications between a base station and a communications device to be made using more than one carrier. This can increase the maximum data rate that may be achieved between a base station and a communications device as compared to when using only one carrier and can help make enable more efficient and productive use of fragmented spectrum. Individual carriers that are aggregated are commonly referred to as component carriers (or sometimes simply components).

For the example of LTE, carrier aggregation was introduced in Release 10 of the standard. In accordance with the current standards for carrier aggregation in an LTE-based system, up to five component carriers can be aggregated for each of downlink and uplink. The component carriers are not required to be contiguous with one another and can have a system bandwidth corresponding to any of the LTE-defined values (1.4 MHz, 3 MHz, 5 MHz, 10 MHz, 15 MHz and 20 MHz), thereby allowing a total bandwidth of up to 100 MHz. Of course it will be appreciated this is just one example of a specific carrier aggregation implementation and other implementations may allow for different numbers of component carriers and/or bandwidths.

Further information on the operation of carrier aggregation in the context of LTE-based wireless telecommunications systems can be found in the relevant standards documents, such as ETSI TS 136 211 V11.5.0 (2014-01)/3GPP TS 36.211 version 11.5.0 Release 11 [2], ETSI TS 136 212 V11.4.0 (2014-01)/3GPP TS 36.212 version 11.4.0 Release 11 [3]; ETSI TS 136 213 V11.6.0 (2014-03)/3GPP TS 36.213 version 11.6.0 Release 11 [4]; ETSI TS 136 321 V11.5.0 (2014-03)/3GPP TS 36.321 version 11.5.0 Release 11 [5]; and ETSI TS 136 331 V11.7.0 (2014-03)/3GPP TS 36.331 version 11.7.0 Release 11 [6].

In accordance with the terminology and implementation used for carrier aggregation in the context of an LTE-based system, a cell is denoted the 'Nell', or Pcell, for a communications device if it is the cell that is initially configured during connection setup for the communications device. Thus the Pcell handles RRC (radio resource control) connection establishment/re-establishment for the communications device. The Pcell is associated with a downlink component carrier and an uplink component carrier (CoC). These may sometimes be referred to herein as primary component carriers. A cell that is configured for use by the communications device after initial connection establishment on the Pcell is termed a 'Scell', or Scell. Thus the Scells are configured after connection establishment to provide additional radio resources. The carriers associated with Scells may sometimes be referred to herein as secondary component carriers.

Figure 2:
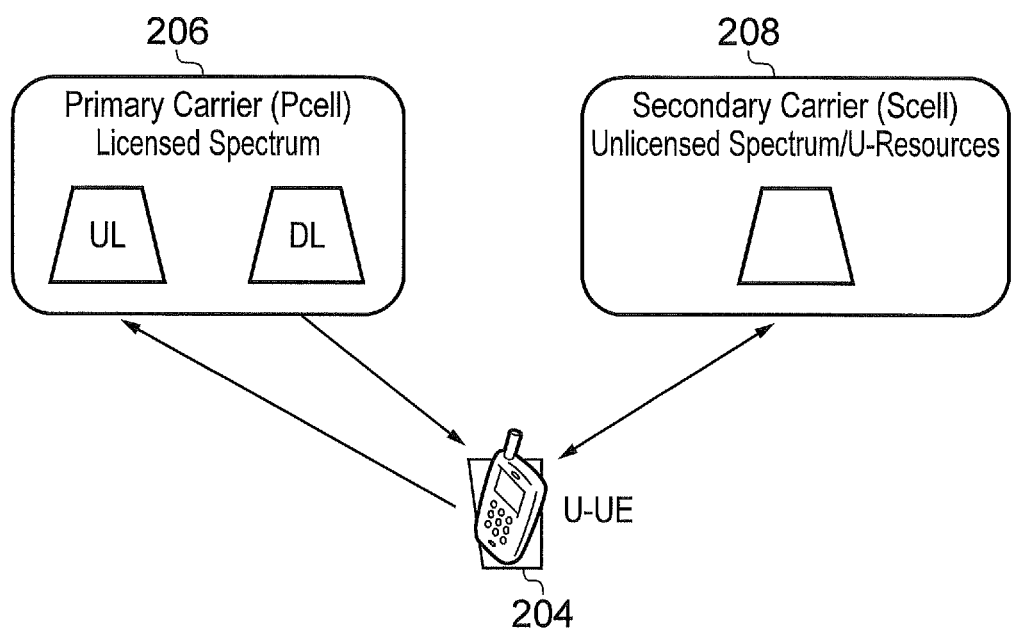
FIG. 2 is a schematic representation illustrating an arrangement in which a communications device is configured to access a primary Pcell via for example an LTE-A band and an un-licensed LTE-U band which forms a secondary Scel.

A representation of an UE, which is capable of performing carrier aggregation and can therefore communicate via the Pcell and the Scell is provided in FIG. 2. As shown in FIG. 2 a UE 204 is configured to transmit and receive signals via a Pcell 206 within a conventional LTE-A bandwidth, but is also configured to at least receive signals on the downlink from an Scell 208 an unlicensed LTE-U bandwidth. The UE 204 is therefore configured according to this example to be a communications device, which is configured to perform carrier aggregation using carrier components, which are available on the LTE-U band. According to this example, random access procedures are primarily handled on the uplink component carrier of the Pcell 206 for the UE 204, although some aspects of contention resolution signalling may be cross-carrier scheduled to another serving cell (i.e. an Scell).

As noted above, carrier aggregation is one approach for making use of unlicensed radio spectrum resources in wireless communication networks, which are primarily designed to use licensed radio spectrum. An example arrangement for determining the location of component carriers within an unlicensed frequency band using reports of received signal strength to form channel quality measurements is disclosed in European patent application number (P104595EP). In broad summary, a carrier aggregation based approach may be used to configure and operate a first component carrier (e.g. a primary component carrier associated with a Pcell in LTE terminology) within a region of the radio spectrum that has been licensed for exclusive use by a wireless telecommunications network, and to also configure and operate one or more further component carriers (e.g. a secondary component carrier associated with an Scell in LTE terminology) in an unlicensed region of the radio spectrum. The secondary component carrier(s) operating in the unlicensed region of the radio spectrum may do so in an opportunistic manner by making use of the unlicensed radio resources when they are available. There may also be provisions made for restricting the extent to which a given operator can make use of the unlicensed radio resources, for example by defining what might be referred to as politeness protocols.

Known carrier aggregation schemes can form a basis for using unlicensed radio spectrum resources (or other forms of shared radio resources) in conjunction with licensed radio spectrum resources. However radio interference in the unlicensed radio spectrum can be expected to be subject to a wider range of unknown and unpredictable variations in time and frequency than might be seen within a region of the radio spectrum which has been licensed for use by a particular wireless applications system. For a given wireless telecommunications system operating in accordance with a given technology, such as LTE-A, interference in the unlicensed radio spectrum may arise from other systems operating quantity same technology, or systems operating according to different technologies, such as Wi-Fi or Bluetooth.

Figure 3:
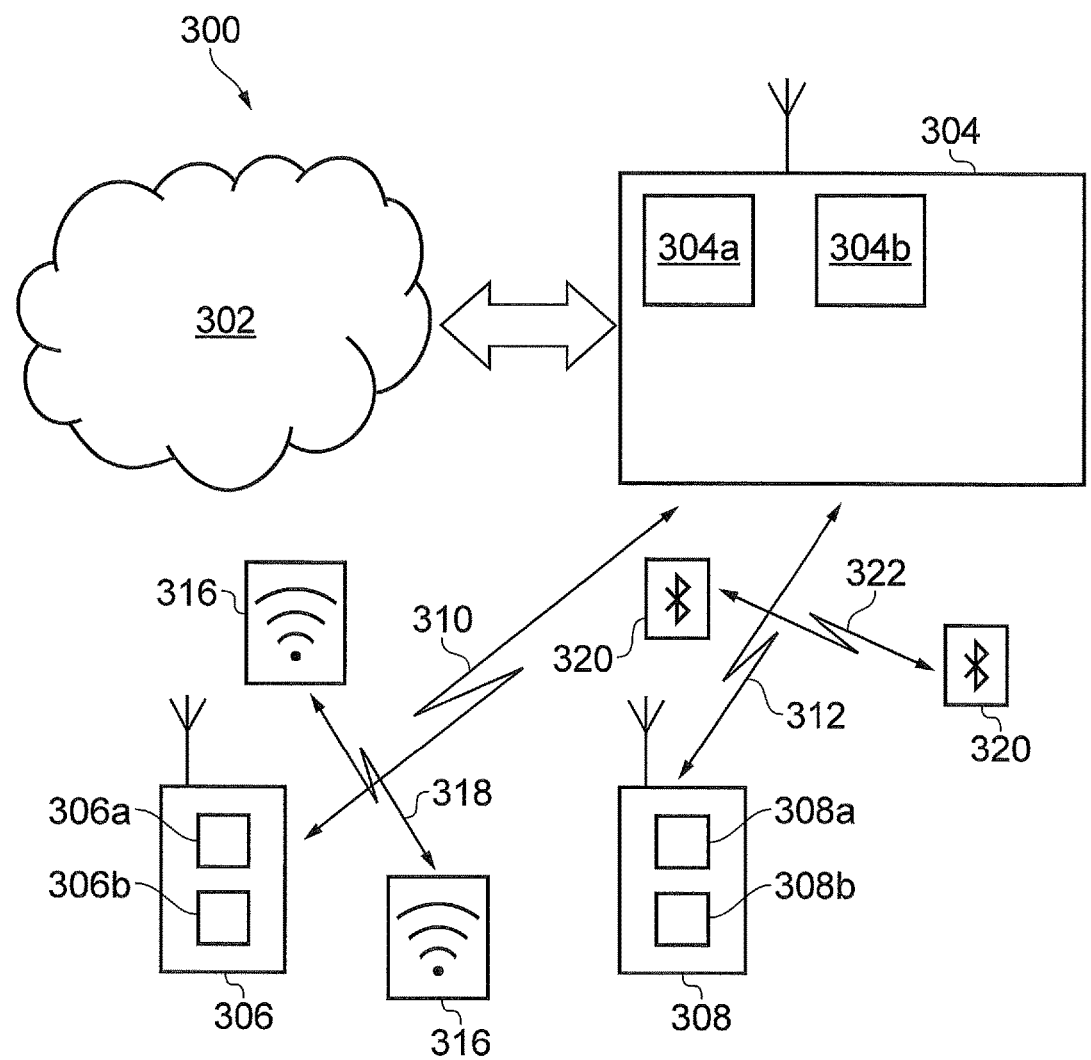
FIG. 3 schematically represents a wireless telecommunications system.

FIG. 3 schematically shows a telecommunications system 300. The telecommunications system 300 in this example is based broadly on an LTE-A type architecture. As such many aspects of the operation of the telecommunications system 300 are standard and well understood and not described here in detail in the interest of brevity. Operational aspects of the telecommunications system 300 which are not specifically described herein may be implemented in accordance with any known techniques, for example according to the established LTE-standards and known variations thereof.

The telecommunications system 300 comprises a core network part (evolved packet core) 302 coupled to a radio network part. The radio network part comprises a base station (evolved-NodeB (eNodeB)) 304, a first communications device 306 and a second communications device 308. It will of course be appreciated that in practice the radio network part may comprise a plurality of base stations serving a larger number of communications devices across various communication cells. However, only a single base station 204 and two communications devices 306, 308 are shown in FIG. 3 in the interests of simplicity.

Although not part of the telecommunications system 300 itself, also shown in FIG. 3 are some other devices which are operable to wirelessly communicate with one another and which are operating within the radio environment of the telecommunications system 300. A pair of wireless access devices 316 communicating with one another via radio link 318 operating in accordance with a Wi-Fi standard and a pair of Bluetooth devices 320 communicating with one another via radio link 322 operating in accordance with a Bluetooth standard. These other devices represent a potential source of radio interference for the telecommunications system 300. It will be appreciated that in practice there will typically be many more such devices operating in the radio environment of the wireless telecommunications system 300, and only two pairs of devices 316, 318 are shown in FIG. 3 for simplicity.

As with a conventional mobile radio network, the communications devices 306, 308 are arranged wirelessly to communicate data to and from the base station (eNodeB) 304. The base station is in turn communicatively connected to a serving gateway, S-GW, (not shown) in the core network part 302 which is arranged to perform routing and management of mobile communications services to the communications devices in the telecommunications system 300 via the base station 304. In order to maintain mobility management and connectivity, the core network part 302 also includes a mobility management entity (not shown) which manages the enhanced packet service, EPS, connections with the communications devices 306, 308 operating in the communications system based on subscriber information stored in a home subscriber server, HSS. Other network components in the core network (also not shown for simplicity) include a policy charging and resource function, PCRF, and a packet data network gateway, PDN-GW, which provides a connection from the core network part 302 to an external packet data network, for example the Internet. As noted above, the operation of the various elements of the communications system 300 shown in FIG. 3 may be broadly conventional apart from where modified to provide functionality in accordance with embodiments of the disclosure as discussed herein.

The communications devices 306, 308 each comprise a transceiver unit 306a, 308a for transmission and reception of wireless signals and a controller unit 306b, 308b configured to control the operation of the respective devices 306, 308 in accordance with embodiments of the disclosure. The respective controller units 306b, 308b may each comprise a processor unit which is suitably configured/programmed to provide the desired functionality described herein using conventional programming/configuration techniques for equipment in wireless telecommunications systems. For each of the communications devices 306, 308, their respective transceiver units 306a, 308a and controller units 306b, 308b are schematically shown in FIG. 3 as separate elements for ease of representation. However, it will be appreciated that for each communications device the functionality of these units can be provided in various different ways.

The base station 304 comprises a transceiver unit 304a for transmission and reception of wireless signals and a controller unit 304b configured to control the base station 304. The controller unit 304b may comprise a processor unit which is suitably configured/programmed to provide the desired functionality described herein using conventional programming/configuration techniques for equipment in wireless telecommunications systems. The transceiver unit 304a and the controller unit 304b are schematically shown in FIG. 3 as separate elements for ease of representation.

Thus, the base station 304 is configured to communicate data with the first and second communications devices 306, 308 over respective first and second radio communication links 310, 312. The wireless telecommunications system 300 supports a carrier aggregation mode of operation in which the first and second radio communication links 310, 312 each comprise a wireless access interface provided by multiple component carriers, for each radio communication link may comprise for example a primary component carrier (Pcell) and one or more secondary component carriers (Scell). Furthermore, the elements comprising the wireless telecommunications system 300 in accordance with this example are assumed to support carrier aggregation in an unlicensed spectrum mode. In this unlicensed spectrum mode the base station 304 communicates with communications devices using a Pcell operating on radio resources within a first frequency band that has been licensed for use by the wireless telecommunications system and one or more secondary component carriers (Scell) operating on radio resources within a second frequency band that has not been licensed for exclusive use by the wireless telecommunications system. The first frequency band may be referred to as a licensed frequency band and the second frequency band may sometimes be referred to herein as an unlicensed (U) frequency band.

In some example the minimum resource allocation of the candidate channel in the second frequency range comprises a segment of communications resource comprising one sub-carrier. In some examples the minimum resource allocation of the candidate channel comprises a segment of communications resource comprising in frequency at least one physical resource block (PRB) of a wireless access interface.

Minimisation of Drive Tests (MDT)

Figure 4:
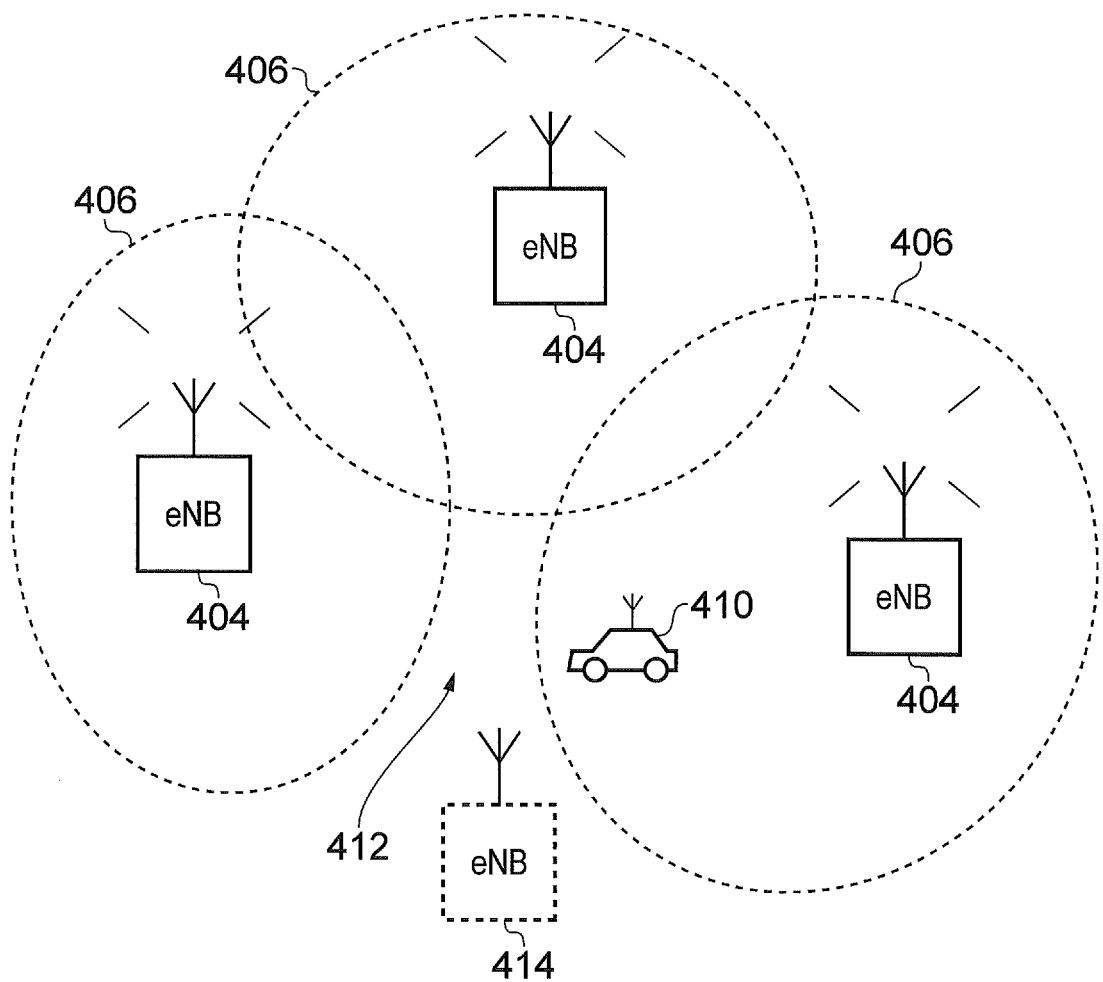
FIG. 4 is a schematic representation illustrating a mobile communications network in which a mobile radio coverage is provided and for which mobile drive tests (MDT) may be performed.

Those familiar with the deployment of radio mobile networks will appreciate that an operator spends a considerable amount of resources in deploying a network and seeks to recover the deployment costs by charging for mobile voice and data services to users of the network. As will be appreciated the revenue generated from a mobile radio network is therefore directly related to a radio coverage which is provided by that mobile radio network. If there is a break in coverage then there will be a corresponding loss of revenue or indeed a reduction in service quality to the users as a result of call dropping or loss of data etc. Accordingly it has been established to conduct so called "drive tests" where a communications device with receiving and transmitting equipment is arranged to detect signals received from base stations of the mobile network and to transmit signals to the mobile radio network in order to identify locations where there is a discontinuity in the coverage provided by the mobile radio network. FIG. 4 provides a schematic illustration of a mobile radio network comprising three base stations 404 for which a radio coverage area provided by each base station is illustrated by a dotted line 406. As shown in FIG. 4 a vehicle 410 is shown which drives around a geographical area provided by the base stations 404. As can be seen by a gap in the dotted lines 406 there is an area 412, which represents a gap in coverage. Accordingly, by identifying the gap 412 in coverage either directional antennas of the base stations 404 can be used to fill in the gap 412 or a further base station 414 can be deployed in order to provide coverage area to the gap.

As will be appreciated, performing drive tests represents a significant cost to the operator of a mobile communications network. Accordingly, it has been proposed for some telecommunications systems such as 3GPP to minimise drive tests by providing an arrangement in which UEs are used to report measurements of signal strengths of received signals from base stations of the network to replace the measurements performed by a drive test. Such a technique is referred to as minimisation of drive tests (MDT) and for example has been studied within 3GPP TS37.320 and is provided in a report 3GPP TR36.805 and network signalling and overall architecture for MDT is disclosed in 3GPP TS32.422.

MDT was initially introduced in 3GPP Rel-10 for both UTRAN and EUTRAN. The primary use-case was to allow operators to reduce EUTRAN deployment cost by enabling UEs in the system to collect measurement and location information and report this to the EUTRAN, in order to optimise deployments by identifying areas where there are problems with coverage, handover failure rates are high, performance is poor and so on. This allows the operator to deploy additional cells and/or improve the network settings such as downlink power, reselection thresholds, handover measurement thresholds, etc, without having to perform expensive "drive tests", which requires sending test engineers to all of these locations to manually collect the results.

In general MDT is not intended to be performed by a single UE. A radio access interface such as an EUTRAN would activate many UEs in an area to perform measurements, and the measurements would then be collected and analysed by the operator to provide a more complete view of the system operation.

As such, MDT is an attractive feature for operators since it can enable significant cost savings when deploying new LTE networks or new features in the existing deployments and this has been reflected by the continued support and enhancement of the feature in 3GPP.

For the example of 3GPP LTE, there are two basic forms of MDT within for example 3GPP release 10, which are Immediate MDT and Logged MDT, and in addition Radio Link Failure reporting, which are described as follows:

Immediate MDT, which defines a functionality for measurements performed by the UE in a CONNECTED state and reporting of the measurements to an eNodeB and/or an RNC available at the time of reporting condition as well as measurements by the network for MDT purposes. Typically these measurements re-use measurement control/report functionality in order for the network to request specific measurements from UEs while in connected mode. The UE can also be requested to provide location information, such as global navigation satellite system (GNSS) location data, or RF measurements in order to estimate a location based on RF fingerprint.

Logged MDT, which refers to an arrangement involving measurement logging by UE in IDLE mode, CELL_PCH, URA_PCH states and CELL_FACH state when second DRX cycle is used (when UE is in UTRA) for reporting to eNodeB and/or an RNC at a later point in time. For a Logged MDT the UE will typically collect measurements which are being performed as part of the normal idle mode procedures (cell selection/reselection) and are stored in a log along with location information, to be reported to the network at a later time, upon request, when in connected mode.

Radio Link Failure (RLF) reporting, provides a facility in which a UE can provide additional information about the cells and locations where the UE was when a radio link failure was experienced.

MDT on LTE-U Band

Embodiments of the present technique concern an arrangement in which a UE, which is configured to communicate via an unlicensed or licensed exempt LTE frequency band forming an Scell, communicates an indication of interference using channel state reports to an infrastructure equipment, with an indication of a location of where the channel state reports were determined. The channel state reports may be provided to the eNodeB via the Pcell so that the infrastructure equipment can identify interference and/or radio coverage in the unlicensed Scell and therefore identify carriers for aggregating in the Scell.

Figure 5:
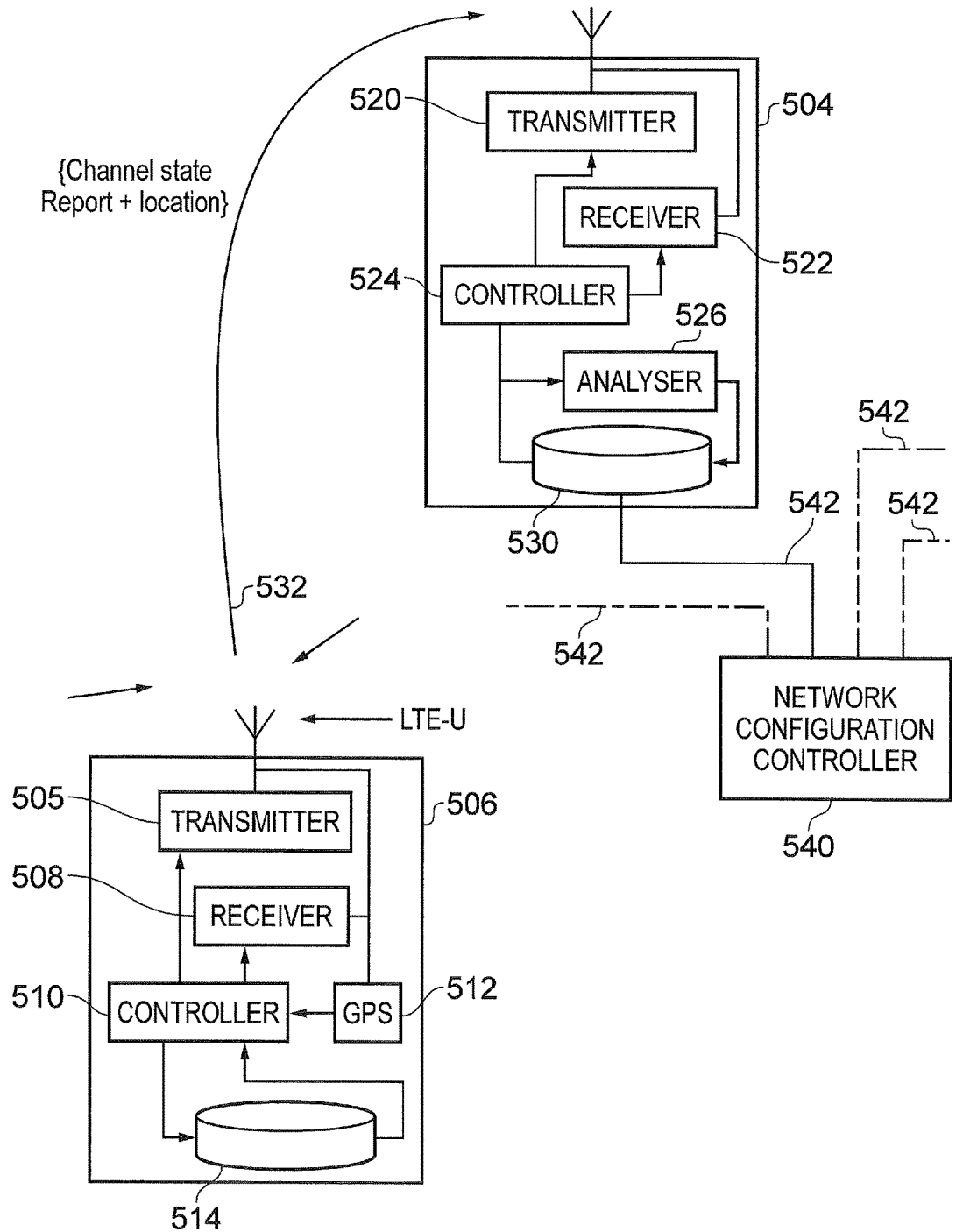
FIG. 5 is a schematic representation in which a communications device is configured to perform channel state measurements with location information and to report this to a base station (eNodeB) for use by a network configuration controller (e.g. an operations and maintenance centre) to configure resources of an un-licensed band according to the present technique.

An example embodiment of the present technique is illustrated in FIG. 5. In FIG. 5 an adapted UE 506 is shown to include a transmitter 505, a receiver 508 and a controller unit 510. The UE 506 also includes a location detection unit, which in one example is a GPS receiver 512 and a data store 514. As shown in FIG. 5 the UE 506 is communicating with and operatively attached to an eNodeb 504, which serves a cell in which the UE 506 is located. As mentioned above the UE is capable of communicating via the LTE-U band as well as the LTE-A band. The eNodeB 504 includes a transmitter 520, a receiver 522 as well as a controller 524, which performs tasks such as scheduling resources of the PDSCH and PUSCH of the wireless access interface in accordance with LTE-A. The eNodeB 504 is also arranged to schedule resources of the LTE-U where the LTE-U band provides sufficient communications resources to form a component carrier of an LTE wireless access interface. The eNodeB 504 also includes an analyser 526 and a database 530.

In accordance with the present technique a UE 506 is arranged in operation to monitor signals within for example the LTE-U band and to recall channel state information associated with the LTEU band. This may include interference detection as well as signal strength of downlink communications from the eNodeB via the LTE-U band or uplink transmissions by other UEs. In accordance with the present technique the controller 510 controls the transmitter 505 and the receiver 508 to detect received signal strength for particular channels and to record the signal strength with a location at which the signal strength was detected by generating a location indication using the location detector 512. The received signal strength values are stored in a data store 514 with an identification of a location of where that signal strength was detected. The controller 510 may combine the signal strength measurements to form channel state indications which are stored (logged) in the data store 514.

In order for the controller 524 to schedule resources in the Scell, measurements gathered in the data base can be used to identify interfering signals which are being transmitted by other sources in the unlicensed frequency band in which the Scell is formed such as WiFi and Bluetooth, as illustrated by the example shown in FIG. 3. For example, downlink channel-dependent scheduling is a feature of LTE. The controller 524, which forms the eNodeB scheduler is configured to assign resources to the UE in downlink subframes partly supported by information the eNodeB receives from the UE on the downlink channel quality. The downlink channel measurements are provided by the UEs as channel-state reports. The channel-state reports may include one or more pieces of information:

Rank indication (RI)
Precoder matrix indication (PMI)
Channel quality indication (CQI)

Together, the combination of the above three indicators constitutes a channel-state report. RI and PMI are only reported if the UE is in a spatial-multiplexing transmission mode.

In some examples the UE 506 is directed to perform MDT tests by generating the channel state indications reports at locations in the geographical area of the cell which are recorded within the data store 514 as logged MDT values. Under the control of the eNodeB the UE 506 is then arranged to transfer the logged channel state indications with location information to the eNodeB as represented by an arrow 532. The eNodeB 504 under control of a controller 524 then analyses the channel state information and location information using the analyser 526 which is then stored in a data store 530 for interrogation and used for example by a network configuration unit 540, which accesses the data store 530 from an interface 542. The network controller 540 may also be connected to data base 530 of the eNodeB 504 (not shown).

According to an example embodiment of the present technique a UE is configured to perform for example WiFi measurements and/or LTE-U channel specific measurements combined with location information to be stored in a UE log and reported to the network. The location information generated by the location detector 512 may be GPS/GNSS location data, or RF fingerprint (list of RF measurements on LTE/UTRAN/GERAN neighbour cells). This measurement logging may be performed by the UE 506 in RRC Connected mode. The UE 506 may perform additional measurements and/or measurement types in idle and connected from WiFi and/or LTE module of the UE.

For the network side, the eNodeB 504 is adapted to request and receive measurements from the UE 506 and may combine these measurements with measurements made by the eNodeB 504 itself. The measurements are stored in the database 530. In some examples the network configuration controller 540 can use the information stored in the data base 530 to optimise automatically parameters such as which LTE-U channels to use in particular locations, to set measurement thresholds and thresholds which can be used to determine how and when to enable LTE-U. Such an arrangement can be referred to as a self-optimising network (SON). In other examples, a sub-set of these functions can be performed by the eNodeB to control the LTE-U component carriers, which are available to it. However in other examples, the network configuration controller 540 can utilise information provided in each of the data bases 530 provided in a plurality of eNodeBs to optimise and to configure dynamically the resources which can be used in the unlicensed band in the presence of interference and radio propagation conditions. In other examples, one or more of the eNodeBs may adjust their transmission or reception parameters to improve coverage in the unlicensed frequency band.

Such a "database" approach could be extended for use by LTE-U operation. Due to the uncoordinated and potentially unplanned nature of communication in the unlicensed bands, the present technique can provide an MDT-like arrangement, which can be used to generate information about a network for use by operators of a mobile network. In addition to the existing MDT use-cases for coverage and capacity optimisation, which would tend to require testing and updating of the network less frequently (for example performed only once at initial deployment) the LTE-U system would require to be updated as an ongoing/regular process in order that the operator can use the least loaded/interfered channels in unlicensed bands. This is because of the more unpredictable and uncoordinated nature of unlicensed spectrum. The spectrum may be shared between different LTE operators as well as being used by other technologies such as WLAN or other radio technologies as shown in FIG. 3.

As such, the location and the time at which measurements take place can provide an arrangement in which not only the strength of signals received by base stations of the network in an un-licensed band can be determined, but interference can be detected. In addition to MDT-type measurements containing location and time information, some examples can provide an arrangement in which the UE 506 is adapted to report it's location in real-time in order that the network configuration controller 540 can provide an optimised or at least improved configuration according to the information that has been collected by the network about the UE's location, and time of day. In other words, the information collected from multiple UEs in combination with a location estimate of a UE which is a candidate for using LTE-U resources can provide the network configuration controller 540 with information as to whether to enable LTE-U, where to enable LTE-U (in terms of geographical location as well as frequency location), and when and how to enable LTE-U.

According to embodiments of the present technique, the information reported by UEs and collected by the network configuration controller 540 can be used not only to reduce the need to perform drive testing by providing information about the operator's own coverage and capacity in order to optimise the network, but also to allow dynamic updating of the provision of carrier components of an un-licensed frequency band. Accordingly a controller in the network can dynamically update and configure a network, thereby implementing a Self Organising Network (SON) in order to be able to efficiently use available unlicensed spectrum. According to such embodiments the network configuration controller 540 can use the reports of the conditions of unlicensed spectrum by other operators and radio access technologies, providing information in order that the controller 540 can decide dynamically how to use LTE-U resources based on a UEs current position and the information known about that location based on previous measurements.

As mentioned above, immediate MDT typically re-uses measurement events intended for normal mobility support, with the addition of location information (GPS/GNSS location or RF fingerprint containing RSRP/RSSI measurements of neighbour EUTRAN cells).

In some example embodiments, different types of UE-based measurements can be provided which may be included within a channel state indicator or may be used instead of the channel state indicator, which are:

1) RF Measurements performed by LTE module of the UE.
   For this case it is expected that the EUTRAN may request a measurement report (e.g. using measurement control message). The measurement may be performed on a DL LTE-U signal on potential or active cells, which would be similar to the existing measurements of LTE cells (difference being at least the channel numbering/frequency). The measurement may also be "channel sensing" which would simply report the measured RF signal/interference on that particular channel. In order to support MDT these would at least need to be combined with location information when reported to the network.

2) CQI reporting/BER/BLER/throughput measurement enhancements.
   May be needed to support carrier aggregation on LTE-U. In order to support MDT these may either be collected by the eNB and combined with location reports from the UE, or may be logged in the UE (in connected mode) and provided to the eNB along with location information. Logged MDT in connected mode would be a new feature for LTE as it is not currently supported.

3) Measurements performed by WiFi module of the UE.
   For this case it is expected that the EUTRAN may request a measurement report (e.g. using measurement control message) containing some of the following information in table 1, which would be obtained by the WiFi module of the UE and combined with location information before reporting to the network.

The above mentioned measurements may therefore be performed by a UE which is configured to operate in accordance with a radio access technology which is different from and in addition to a radio access technology of the mobile communications network. For example the first radio access technology of the mobile communications network may be determined in accordance with a LTE technology.

However a receiver in the UE may also be configured to communicate via a WiFi access point and so may be configured to operate in accordance with a WiFi radio access technology (IEEE 808.11b). Accordingly if both radio access technologies are transmitting signals within a unlicensed frequency band (LTE-U) band, the UE can generate measurement information for signals received in accordance with both radio access technologies.

In some examples the measurement information for each radio access technology (LTE and WiFi) may be combined for a candidate carrier to form a combined measurement information for the candidate carrier. This combination of two types of measurement information for two radio access technologies can be made in either the UE or the eNodeB (base station).

For the example of the WiFi radio technology, the following table is an extract from R2-142731 and reply Liaison on WLAN signal measurements for WLAN/3GPP Radio interworking, from IEEE 802.11, providing examples of measurement information, which can be generated for this radio access technology:

TABLE 1

802.11 Metrics Suitable for WLAN Selection and Reselection.

| Metric Name | Available in Beacon or Probe Response | Available in Measurement | Available via ANQP | Note |
|---|---|---|---|---|
| RCPI | Y | Y See Note 1. | | From STA channel scan. From Beacon Measurement by STA. Or from Link Measurement by STA or AP |
| RSNI | Y. | Y See Note 1. | | From channel scan. From Beacon Measurement by STA. Or from Link Measurement by STA or AP. |
| ANPI | | Y See Note 1. | | From Noise Histogram Measurement by STA. |
| Channel Load | | Y | | From Channel Load Measurement by STA or AP. |
| SSID | Y | | | From channel scan. |
| BSS Load | Y | | | From channel scan. Measured at AP. |
| BSS Avg Access Delay | Y | Y | | From channel scan. From STA Statistics Measurement by STA. Measured at AP for non-QOS STAs. |
| BSS AC Access Delay | Y | Y | | From channel scan. From STA Statistics Measurement by STA. Measured at AP for QOS streams. |
| BSS Available Admission Capacity | Y | | | From channel scan. When admission control is in use, this is estimated at AP. |
| Noise Histogram | | Y | | From Noise Histogram Measurement at AP or STA. |
| Tx/Rx Frame Count | | Y | | From STA Statistics Measurement by STA or AP. |
| QOS Tx/Rx Frame Count | | Y | | From STA Statistics Measurement by STA or AP. For QOS streams. |
| FCS Error Count | | Y | | From STA Statistics Measurement by STA or AP. |
| Retry Count | | Y | | From STA Statistics Measurement by STA or AP. |
| Retry AMSDU Count | | Y | | From STA Statistics Measurement by STA or AP. |
| Supported Operating Classes | Y | | | From channel scan. From AP for BSS. |
| BSS Description | Y | | | From channel scan. From AP for BSS. Includes parameters such as: operating channel width, number of spatial streams, LDPC, beamforming, aggregation, etc. |
| Roaming Consortium | Y | | Y | From channel scan. From AP for BSS, or through AP in ANQP Query. |
| NAI Realm | | | Y | Through AP in ANQP Query. |
| 3GPP Cell Network | | | Y | Through AP in ANQP Query. |
| Capability Lists | | | Y | Through AP in ANQP Query. |
| WAN Metrics | | | Y | Through AP in ANQP Query. This is vendor specific metric used by Wi-Fi Alliance. |
| STA Capabilities | | | | From STA; Includes parameters such as: operating channel width, number of spatial streams, LDPC, beamforming, aggregation, etc. |

Logged MDT:

As mentioned above, immediate MDT typically re-uses measurements performed as part of idle mode cell selection and reselection. Measurements are stored along with available location information and collected by the network at a later stage during RRC Connected mode.

It is unlikely the UE would perform measurements on LTE-U as part of cell selection/reselection, and so this would need to be configured as an additional measurement to perform. This is not according to the current MDT principle that the UE should report already available measurements. However, it is likely that the UE will be performing WiFi measurements, because the UE already does some WiFi scanning today and with the addition of WLAN offload functionality there could also be some NW assistance for UEs in idle mode to perform WiFi measurements.

WLAN Interworking Use-Case

The addition of the possibility to include WiFi measurements (from WiFi module) in the MDT log, combined with location and RF measurements performed by the LTE module, could provide important information to the operator for the purpose of network optimisation for LTE-U. Additionally this can help with the setting of thresholds and network optimisation for WLAN interworking (whereby the operator has a possibility to offload certain traffic from EUTRAN/UTRAN to WLAN access points).

The WiFi measurements described above would be useful, the difference being what the network uses the measurements for.

In addition, some additional events may be useful, such as offload failure (e.g. UE attempts to reselect to WiFi according to the network defined thresholds/rule but does not complete, or does not achieve required QoS when arriving at the WLAN AP. Even the possibility to log when the UE is using LTE and when the UE is using WiFi can help the operator to better define the thresholds for network selection.

Summary of Operations

Figure 6:
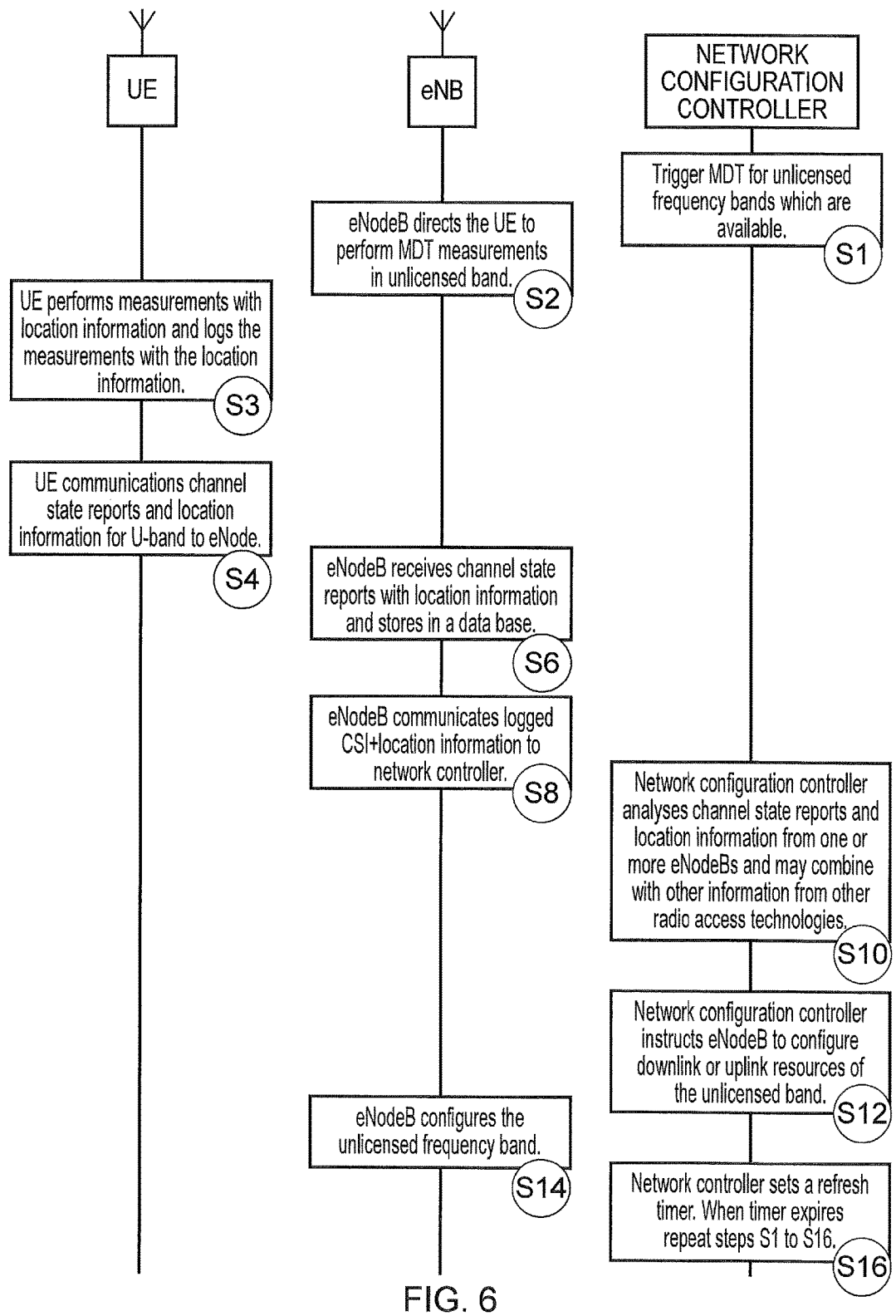
FIG. 6 is a representation of a flow diagram in which the operation of a communications device, a base station and a network configuration controller are represented according to the present technique.

FIG. 6 provides an illustrative flow diagram according to an example embodiment, which summarises the present technique explained above. FIG. 6 is described as follows:

S1: As a first step under the control of the network configuration controller 540, the network configuration controller 540 triggers MDT tests for the unlicensed frequency bands which are available within an area which is served by the network configuration controller 540. This may be one base station or several base stations (eNodeB). In one example the network configuration controller 540 forms part of an operation and maintenance centre of the mobile network.

S2: The base station then directs the UE 506 or one or more other UE's to perform MDT measurements in the unlicensed frequency band.

S3: The UE then performs measurements with location information and logs the measurements with the location information in a data store 514.

S4: The UE then communicates channel measurement information (measured signals for either the LTE radio access technology or interfering signals) and location information under the control of the eNodeB to the eNodeB.

S6: The eNodeB then receives the channel state information with the location information and processes these reports and stores them in a database.

S8: The eNodeB then communicates the logged channel state information with the location information corresponding to that channel state information to the network configuration controller.

S10: The network configuration controller 540 which coordinates with the eNodeB and one or more other eNodeB's to retrieve the channel state reports and location information from the respective data bases 530 and then analyses these channel state reports and location information. In some examples the channel state information with location information is combined with information or measured on other radio access technologies to identify interference patterns or locations in frequency and geography of areas where interference is strong.

S12: The network configuration controller then dynamically instructs the eNodeB to configure downlink or uplink resources of the unlicensed frequency band. The instructions are communicated to each of the eNodeB's for which the network configuration controller is responsible.

S14: The instructions are received from the eNodeB from the network configuration controller which configures the unlicensed frequency band by identifying the component carriers in the downlink for example and/or the uplink which can be allocated to UEs for use in the unlicensed frequency band. In one example the configuration of the unlicensed frequency band is communicated to all UEs which are able to operate in the unlicensed frequency band (carrier aggregation UEs) as system information which is broadcast by the eNodeB periodically.

S16: The network controller then sets a timer in order to set a period to respond to any adjustments or adaptations in the use of the unlicensed frequency band, for example from interfering signals or changes in spectrum allocation. If the timer expires then the network configuration controller proceeds back to step S1 to trigger the MDT for the unlicensed frequency bands and steps S1 to S16 are repeated.

Further particular and preferred aspects of the present invention are set out in the accompanying independent and dependent claims. It will be appreciated that features of the dependent claims may be combined with features of the independent claims in combinations other than those explicitly set out in the claims.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

Respective features of the present disclosure are defined by the following numbered paragraphs:

Paragraph 1. A communications device for transmitting data to or receiving data from a mobile communications network, the mobile communications network including infrastructure equipment, the infrastructure equipment providing a wireless access interface for transmitting signals to or receiving signals from the communications device, the communications device comprising:

a transmitter configured to transmit the signals to the infrastructure equipment via the wireless access interface in accordance with a first radio access technology, a receiver configured to receive the signals from the infrastructure equipment via the wireless access interface in accordance with the first radio access technology, and a controller for controlling the transmitter and the receiver, wherein the wireless access interface provides a primary carrier within a first frequency range, which forms a primary cell providing a contiguous set of communications resources across the first frequency range, and the controller is configured in combination with the receiver and transmitter to generate data representing an estimation of a location of the communications device, to detect signals received within one or more predefined candidate channels within a second frequency range which is different to and mutually exclusive from the first frequency range at the estimated location, each of the candidate channels in the second frequency range representing a minimum unit of communications resource, and the detected signals within the second frequency range being at least one of signals transmitted by the infrastructure equipment or another communications device in accordance with the first radio access technology or transmitted in accordance with at least one other radio access technology, to generate, for each of the one or more candidate channels, channel measurement information from the signals detected within the candidate at the estimated location, and to transmit the channel measurement information with an indication of the estimated location for each of the candidate channels to the infrastructure equipment.

Paragraph 2. A communications device according to paragraph 1, comprising a data store operatively coupled to the controller, wherein the controller is configured in combination with the receiver and the transmitter, to store data representing the channel measurement information with the indication of the estimated location where the signals were detected which were used to generate the channel measurement information, in the data store, to receive a request for the channel measurement information from the mobile communications network via the infrastructure equipment, and in response to the request to transmit the channel measurement information and the indication of the estimated location to the infrastructure equipment.

Paragraph 3. A communications device according to paragraph 1 or 2, wherein the controller is configured in combination with the receiver and transmitter to receive an indication, from the infrastructure equipment of one or more component channels selected from the one or more candidate channels from which the communications device can receive signals from the infrastructure equipment on the down-link, the one or more component channels having been selected from the predefined one or more candidate channels within the second frequency range using the channel measurement information and the estimated location of the communications device for each of the plurality of candidate channels.

Paragraph 4. A communications device according to paragraphs 1, 2 or 3, wherein the channel measure information comprises a channel state reports relating to the reception of the detected signal from an the infrastructure equipment or reception of interfering signals from other sources for each of the one or more candidate carriers of the second frequency band.

Paragraph 5. A communications device according to paragraph 4, wherein the controller is configured in combination with the receiver and the transmitter to transmit the one or more channel state reports with the indication of the estimated location of the communications device to the infrastructure equipment via the first frequency band providing the primary cell.

Paragraph 6. A communications device according to paragraph 5, wherein the controller is configured in combination with the receiver to determine a relative strength of the received signals detected within the plurality of candidate channels in the second frequency range, by comparing the strength of the received signals with respect to one or more predetermined thresholds, and to generate the channel state report for the candidate carrier from the comparison of the relative strength of the received signal and the one or more thresholds.

Paragraph 7. A communications device according to any of paragraphs 1 to 6, wherein the receiver is configured to receive signals transmitted via a wireless access interface in accordance with a second radio access technology within the second frequency range, the detected signals within the second frequency range being the signals transmitted in accordance with the second radio access technology, the channel measurement information representing an amount of interference caused by the second radio technology with respect to signals transmitted or received in accordance with the first radio access technology.

Paragraph 8. A communications device according to paragraph 7, wherein the first radio access technology is defined in accordance with a Long Term Evolution wireless access interface, the second and the second radio access technology is defined in accordance with a WiFi standard, the second frequency band being an unlicensed frequency band.

Paragraph 9. A method of transmitting data to a mobile communications network from a communications device or receiving data from a mobile communications network at a communications device, the mobile communications network including an infrastructure equipment, the method comprising transmitting signals representing the data from the communications device to the infrastructure equipment via a wireless access interface in accordance with a first radio access technology provided by the infrastructure equipment, receiving signals representing the data at the communications device from the infrastructure equipment via the wireless access interface in accordance with the first radio access technology, and controlling the transmitting or the receiving the signals, wherein the wireless access interface provides a primary carrier within a first frequency range, which forms a primary cell providing a contiguous set of communications resources across the first frequency range, and the controlling the transmitting the signals or receiving the signals includes generating data representing an estimation of a location of the communications device, detecting signals received within one or more predefined candidate channels within a second frequency range which is different to and mutually exclusive from the first frequency range, at the estimated location, each of the candidate channels in the second frequency range representing a minimum unit of communications resource, and the detected signals within the second frequency range being at least one of signals transmitted by the infrastructure equipment or another communications device in accordance with the first radio access technology or transmitted in accordance with at least one other radio access technology, generating, for each of the one or more candidate channels, channel measurement information from the signals detected within the candidate channel at the estimated location, transmitting the channel measurement information with an indication of the estimated location for each of the candidate channels to the infrastructure equipment.

Paragraph 10. A method according to paragraph 9, comprising receiving an indication, from the infrastructure equipment of one or more component channels selected from the one or more candidate channels from which the communications device can receive signals from the infrastructure equipment on the down-link, the one or more component channels having been selected from the predefined one or more candidate channels within the second frequency range using the channel measurement information and the estimated location of the communications device for each of the plurality of candidate channels.

Paragraph 11. An infrastructure equipment forming part of a mobile communications network for transmitting data to or receiving data from communications devices, the infrastructure equipment comprising a transmitter configured to transmit the signals to communications devices via a wireless access interface in accordance with a first radio access technology, a receiver configured to receive the signals from the communications devices via the wireless access interface in accordance with the first radio access technology, and a controller for controlling the transmitter and the receiver to form the wireless access interface, the wireless access interface providing a first primary carrier within a first frequency range, which forms a primary cell providing a contiguous set of communications resources across the first frequency range, wherein the controller is configured in combination with the receiver and transmitter to transmit to one or more of the communications devices a request for channel measurement information and an estimated location at which the channel measurement information was generated for each of one or more predefined candidate channels within a second frequency range which is different to and mutually exclusive from the first frequency range, each of the candidate channels in the second frequency range representing a minimum unit of communications resource which can be used to receive data on the downlink, and the channel measurement information within the second frequency range being determined from at least one of signals transmitted by the infrastructure equipment or another communications device in accordance with the first radio access technology or transmitted in accordance with at least one other radio access technology, to receive in response to the request from the one or more communications devices the channel measurement information and the estimated location information where the channel measurement information was generated for the second frequency range, and to store the channel measurement information with the estimated location of where the channel measurement information was generated in a data store for use in selecting one or more component carriers, from the one or more candidate carriers.

Paragraph 12. An infrastructure equipment according to paragraph 11, wherein the controller is configured in combination with the transmitter and a receiver to transmit an indication identifying a selected one or more component channels to the at least one communications device based upon a location of the one or more component channels for use in transmitting signals to the one or more communications devices via the second frequency range.

Paragraph 13. An infrastructure equipment according to paragraph 11, wherein the channel measurement information includes information representative of measurements determined from signals received from either the first radio access technology or the at least one other radio access technology or the first and the at least one other radio access technology.

Paragraph 14. An infrastructure equipment according to paragraph 11, wherein the channel measurement information for a candidate carrier includes information representative of measurements determined from signals received from the first radio access technology and the at least one other radio access technology and the controller is configured to combine measurement information determined for the first radio access technology with measurement information determined for the at least one other radio access technology to form a combined measurement information for the candidate carrier and to store the combined measurement information for the candidate carrier in the data store.

Paragraph 15. An infrastructure equipment according to paragraph 11, wherein the channel measurement information comprise one or more channel state reports which are received from the communications devices on the up-link of the primary cell.

Paragraph 16. A method of transmitting data to or receiving data from communications devices using an infrastructure equipment, which forms part of a mobile communications network, the method comprising transmitting the signals to communications devices via a wireless access interface in accordance with a first radio access technology, receiving the signals from the communications devices via the wireless access interface in accordance with the first radio access technology, and controlling the transmitting and the receiving to form the wireless access interface, the wireless access interface providing a first primary carrier within a first frequency range, which forms a primary cell providing a contiguous set of communications resources across the first frequency range, wherein the transmitting the signals to the communications devices includes transmitting to one or more of the communications devices a request for channel measurement information and an estimated location at which the channel measurement information was generated for each of one or more predefined candidate channels within a second frequency range which is different to and mutually exclusive from the first frequency range, each of the candidate channels in the second frequency range representing a minimum unit of communications resource which can be used to receive data on the downlink, and the channel measurement information within the second frequency range being determined from at least one of signals transmitted by the infrastructure equipment or another communications device in accordance with the first radio access technology or transmitted in accordance with at least one other radio access technology, and the receiving comprises receiving in response to the request from the one or more communications devices the channel measurement information and the estimated location information where the channel measurement information was generated for the second frequency range, and storing the channel measurement information with the estimated location of where the channel measurement information was generated in a data store for use in selecting one or more component carriers, from the one or more candidate carriers.

Paragraph 17. A method of transmitting according to paragraph 16, wherein the transmitting the signals to the communications devices includes transmitting an indication identifying a selected one or more component channels to the at least one communications device based upon a location of the one or more component channels for use in transmitting signals to the one or more communications devices via the second frequency range.

Paragraph 18. An infrastructure equipment forming part of a mobile communications network, the infrastructure equipment comprising a communications interface configured to receive information from one or more base stations of the mobile communications network, the base stations being configured to transmit signals to communications devices via a wireless access interface and to receive signals from the communications devices via the wireless access interface, the wireless access interface providing a first primary carrier within a first frequency range, which forms a primary cell for the base station providing a contiguous set of communications resources across the first frequency range, and a second frequency range which is different to and mutually exclusive from the first frequency range and providing a plurality of one or more candidate carriers for forming a secondary cell for the base station, a controller configured to receive, from the one or more base stations via the communications interface, channel measurement information for the second frequency range and estimated location information of where the channel measurement information was generated by the one or more communications devices, the channel measurement information within the second frequency range being determined from at least one of signals transmitted by the infrastructure equipment or another communications device in accordance with the first radio access technology or transmitted in accordance with at least one other radio access technology, and to configure the one or more base stations to provide one or more component carriers, from the one or more candidate carriers which could be provided from the second frequency range in accordance with the channel measurement information and the estimated location information.

Paragraph 19. A method of configuring a mobile communications network, the method comprising receiving information from one or more base stations of the mobile communications network, the base stations being configured to transmit signals to communications devices via a wireless access interface and to receive signals from the communications devices via the wireless access interface, the wireless access interface providing a first primary carrier within a first frequency range, which forms a primary cell for the base station providing a contiguous set of communications resources across the first frequency range, and a second frequency range which is different to and mutually exclusive from the first frequency range and providing a plurality of one or more candidate carriers for forming a secondary cell for the base station, the information received from the one or more base stations comprising channel measurement information for the second frequency range and estimated location information of where the channel measurement information was generated by the one or more communications devices, the channel measurement information within the second frequency range being determined from at least one of signals transmitted by the infrastructure equipment or another communications device in accordance with the first radio access technology or transmitted in accordance with at least one other radio access technology, and configuring the one or more base stations to provide one or more component carriers, from the one or more candidate carriers which could be provided from the second frequency range in accordance with the channel measurement information and the estimated location information.

Paragraph 20. A mobile communications network including an infrastructure equipment according to any of paragraphs 11 to 14 or 17.

REFERENCES

[1] Holma H. and Toskala A, "LTE for UMTS OFDMA and SC-FDMA based radio access", John Wiley and Sons, 2009
[2] ETSI TS 136 211 V11.5.0 (2014-01)/3GPP TS 36.211 version 11.5.0 Release 11
[3] ETSI TS 136 212 V11.4.0 (2014-01)/3GPP TS 36.212 version 11.4.0 Release 11
[4] ETSI TS 136 213 V11.6.0 (2014-03)/3GPP TS 36.213 version 11.6.0 Release 11
[5] ETSI TS 136 321 V11.5.0 (2014-03)/3GPP TS 36.321 version 11.5.0 Release 11
[6] ETSI TS 136 331 V11.7.0 (2014-03)/3GPP TS 36.331 version 11.7.0 Release 11
[7] R2-142731 Liaison on WLAN signal measurements for WLAN/3GPP Radio interworking, from IEEE 802.11
[8] 3GPP TS 37.320 Release 11
[9] 3GPP TS 36.214 Release 11
[10] 3GPP TS 36.314 Release 11
[11] 3GPP TS 36.213 Release 11

Annex 1

The following provides relevant extracts from relevant 3GPP specs:

From 3GPP TS 37.320 [8]:

Measurements:

M1: RSRP and RSRQ measurement by UE, see TS 36.214 [9].

M2: Power Headroom measurement by UE, see TS 36.213 [4].

M3: Received Interference Power measurement by eNB, see TS 36.214 [11]. This is a cell measurement. One sample is logged each measurement collection period, where one sample corresponds to a measurement period as specified in TS 36.133 [3].

M4: Data Volume measurement separately for DL and UL, per QCI per UE, by eNB, see TS 36.314.

M5: Scheduled IP Throughput for MDT measurement separately for DL and UL, per RAB per UE and per UE for the DL, per UE for the UL, by eNB, see TS 36.314 [10]. QCI values of the RABs that have contributed to a measurement value are logged with the measurement values.

Logged MDT

MDT functionality involving measurement logging by UE in IDLE mode, CELL_PCH, URA_PCH states and CELL_FACH state when second DRX cycle is used (when UE is in UTRA) for reporting to eNB/RNC at a later point in time.

Typically the UE will collect measurements which are being performed as part of the normal idle mode procedures (cell selection/reselection) and are stored in a log along with location information, to be reported to the network at a later time, upon request, when in connected mode.

From 3GPP TS 37.320 [8]:

The measurement reports for neighbour cells consist of:
Physical cell identity of the logged cell
Carrier frequency
RSRP and RSRQ for EUTRA
RSCP and Ec/No for UTRA,
P-CCPCH RSCP for UTRA 1.28 TDD, and
Rxlev for GERAN
Pilot Pn Phase and Pilot Strength for CDMA2000

From 3GPP TS 37.320 [8]:

The UE logs failed RRC connection establishments for LTE and UMTS, i.e. a log is created when the RRC connection establishment procedure fails. The UE logs failed RRC connection establishments without the need for prior configuration by the network.

The UE stores the Selected PLMN on the RRC connection establishment failure. Only if that PLMN is the same as the RPLMN, the UE may report the log.

Note: There is no expected performance degradation for networks using EPLMNs.

The trigger for creating a log related to a failed RRC connection establishment is for LTE when timer T300 expires and for UMTS when V300 is greater then N300.

The UE shall store the following information related to the failed RRC connection establishment:
Time stamp, which is the elapsed time between logging and reporting the log.
The global cell identity of the serving cell when the RRC connection establishment fails, i.e. the cell which the UE attempted to access.
The latest available radio measurements for any frequency or RAT
The latest detailed location information, if available.
For LTE:
Number of Random Access Preambles transmitted,
Indication whether the maximum transmission power was used.
Contention detected In Rel-12, MDT was further enhanced to support eMBMS.

From 3GPP TS 37.320 [8]:

The MBSFN measurement results consist of, per MBSFN area where MBMS service is received:
MBSFN area identity
Carrier frequency
MBSFN RSRP
MBSFN RSRQ
MCH BLER for signalling
MCH BLER for data, and related MCH index Measurements are performed in accordance with requirements defined in TS 25.133 [2] and TS 36.133 [3].

General

From 3GPP TS 37.320 [8]:

The general principles and requirements guiding the definition of functions for Minimization of drive tests are the following:

1. MDT mode
   There are two modes for the MDT measurements: Logged MDT and Immediate MDT. There are also cases of measurement collection not specified as either immediate or logged MDT, such as Accessibility measurements.
2. UE measurement configuration
   It is possible to configure MDT measurements for the UE logging purpose independently from the network configurations for normal RRM purposes. However, in most cases, the availability of measurement results is conditionally dependent on the UE RRM configuration.
3. LTE measurement collection and reporting
   UE MDT measurement logs consist of multiple events and measurements taken over time. The time interval for measurement collection and reporting is decoupled in order to limit the impact on the UE battery consumption and network signalling load.
4. Geographical scope of measurement logging
   It is possible to configure the geographical area where the defined set of measurements shall be collected.
5. Location information
   The measurements shall be linked to available location information and/or other information or measurements that can be used to derive location information.
6. Time information
   The measurements in measurement logs shall be linked to a time stamp.
7. UE capability information
   The network may use UE capabilities to select terminals for MDT measurements.
8. Dependency on SON
   The solutions for MDT are able to work independently from SON support in the network. Relation between measurements/solution for MDT and UE side SON functions shall be established in a way that re-use of functions is achieved where possible.
9. Dependency on TRACE
   The subscriber/cell trace functionality is reused and extended to support MDT. If the MDT is initiated toward to a specific UE (e.g. based on IMSI, IMEI-SV, etc.), the signalling based trace procedure is used, otherwise the management based trace procedure (or cell traffic trace procedure) is used. Network signalling and overall control of MDT is described in TS 32.422 [6].

The solutions for MDT shall take into account the following constraints:

1. UE measurements
   The UE measurement logging mechanism is an optional feature. In order to limit the impact on UE power consumption and processing, the UE measurement logging should as much as possible rely on the measurements that are available in the UE according to radio resource management enforced by the access network.

2. Location information

The availability of location information is subject to UE capability and/or UE implementation. Solutions requiring location information shall take into account power consumption of the UE due to the need to run its positioning components.

What is claimed is:

1. A communications device for transmitting data to or receiving data from a mobile communications network, the mobile communications network including infrastructure equipment, the infrastructure equipment providing a wireless access interface for transmitting signals to or receiving signals from the communications device, the communications device comprising:
   a transmitter configured to transmit the signals to the infrastructure equipment via the wireless access interface in accordance with a first radio access technology,
   a receiver configured to receive the signals from the infrastructure equipment via the wireless access interface in accordance with the first radio access technology, and
   a controller for controlling the transmitter and the receiver, wherein the wireless access interface provides a primary carrier within a first frequency range, which forms a primary cell providing a contiguous set of communications resources across the first frequency range, and the controller is configured in combination with the receiver and transmitter
   to generate data representing an estimation of a location of the communications device,
   to detect signals received within one or more predefined candidate channels within a second frequency range which is different to and mutually exclusive from the first frequency range at the estimated location, each of the candidate channels in the second frequency range representing a minimum unit of communications resource, and the detected signals within the second frequency range being at least one of signals transmitted by the infrastructure equipment or another communications device in accordance with the first radio access technology or transmitted in accordance with at least one other radio access technology,
   to generate, for each of the one or more candidate channels, channel measurement information regarding the second frequency range from the signals detected within the candidate channels at the estimated location,
   to store in a log the channel measurement information regarding the second frequency range along with the estimated location where the channel measurement information is generated, and
   to transmit, via the first frequency range, the channel measurement information regarding the second frequency range together with an indication of the estimated location where the channel measurement information is generated for each of the candidate channels to the infrastructure equipment.

2. The communications device as claimed in claim 1, comprising a data store operatively coupled to the controller, wherein the controller is configured in combination with the receiver and the transmitter,
   to store data representing the channel measurement information with the indication of the estimated location where the signals were detected which were used to generate the channel measurement information, in the data store,
   to receive a request for the channel measurement information from the mobile communications network via the infrastructure equipment, and
   in response to the request, to transmit the channel measurement information and the indication of the estimated location to the infrastructure equipment.

3. The communications device as claimed in claim 1, wherein the controller is configured in combination with the receiver and transmitter
   to receive an indication, from the infrastructure equipment of one or more component channels selected from the one or more candidate channels from which the communications device can receive signals from the infrastructure equipment on the down-link, the one or more component channels having been selected from the predefined one or more candidate channels within the second frequency range using the channel measurement information and the estimated location of the communications device for each of the plurality of candidate channels.

4. The communications device as claimed in claim 1, wherein the channel measure information comprises a channel state reports relating to the reception of the detected signal from an the infrastructure equipment or reception of interfering signals from other sources for each of the one or more candidate carriers of the second frequency band.

5. The communications device as claimed in claim 4, wherein the controller is configured in combination with the receiver and the transmitter
   to transmit the one or more channel state reports with the indication of the estimated location of the communications device to the infrastructure equipment via the first frequency range providing the primary cell.

6. The communications device as claimed in claim 5, wherein the controller is configured in combination with the receiver
   to determine a relative strength of the received signals detected within the plurality of candidate channels in the second frequency range, by comparing the strength of the received signals with respect to one or more predetermined thresholds, and
   to generate the channel state report for the candidate carrier from the comparison of the relative strength of the received signal and the one or more thresholds.

7. The communications device as claimed in claim 1, wherein the receiver is configured to receive signals transmitted via a wireless access interface in accordance with a second radio access technology within the second frequency range, the detected signals within the second frequency range being the signals transmitted in accordance with the second radio access technology, the channel measurement information representing an amount of interference caused by the second radio technology with respect to signals transmitted or received in accordance with the first radio access technology.

8. The communications device as claimed in claim 7, wherein the first radio access technology is defined in accordance with a Long Term Evolution wireless access interface, the second and the second radio access technology is defined in accordance with a WiFi standard, the second frequency band being an unlicensed frequency band.

9. A method of transmitting data to a mobile communications network from a communications device or receiving data from a mobile communications network at a communications device, the mobile communications network including an infrastructure equipment, the method comprising transmitting signals representing the data from the communications device to the infrastructure equipment via a wireless access interface in accordance with a first radio access technology provided by the infrastructure equipment,
receiving signals representing the data at the communications device from the infrastructure equipment via the wireless access interface in accordance with the first radio access technology, and
controlling the transmitting or the receiving the signals, wherein the wireless access interface provides a primary carrier within a first frequency range, which forms a primary cell providing a contiguous set of communications resources across the first frequency range, and the controlling the transmitting the signals or receiving the signals includes
generating data representing an estimation of a location of the communications device,
detecting signals received within one or more predefined candidate channels within a second frequency range which is different to and mutually exclusive from the first frequency range, at the estimated location, each of the candidate channels in the second frequency range representing a minimum unit of communications resource, and the detected signals within the second frequency range being at least one of signals transmitted by the infrastructure equipment or another communications device in accordance with the first radio access technology or transmitted in accordance with at least one other radio access technology,
generating, for each of the one or more candidate channels, channel measurement information regarding the second frequency range from the signals detected within the candidate channels at the estimated location,
storing in a log the channel measurement information regarding the second frequency range along with the estimated location where the channel measurement information is generated, and
transmitting, via the first frequency range, the channel measurement information regarding the second frequency range together with an indication of the estimated location where the channel measurement information is generated for each of the candidate channels to the infrastructure equipment.

10. The method as claimed in claim 9, comprising
receiving an indication, from the infrastructure equipment of one or more component channels selected from the one or more candidate channels from which the communications device can receive signals from the infrastructure equipment on the down-link, the one or more component channels having been selected from the predefined one or more candidate channels within the second frequency range using the channel measurement information and the estimated location of the communications device for each of the plurality of candidate channels.

11. An infrastructure equipment forming part of a mobile communications network for transmitting data to or receiving data from communications devices, the infrastructure equipment comprising
a transmitter configured to transmit the signals to communications devices via a wireless access interface in accordance with a first radio access technology,
a receiver configured to receive the signals from the communications devices via the wireless access interface in accordance with the first radio access technology, and
a controller for controlling the transmitter and the receiver to form the wireless access interface, the wireless access interface providing a first primary carrier within a first frequency range, which forms a primary cell providing a contiguous set of communications resources across the first frequency range, wherein the controller is configured in combination with the receiver and transmitter
to transmit to one or more of the communications devices a request for channel measurement information regarding a second frequency range and an estimated location at which the channel measurement information was generated for each of one or more predefined candidate channels within the second frequency range which is different to and mutually exclusive from the first frequency range, each of the candidate channels in the second frequency range representing a minimum unit of communications resource which can be used to receive data on the downlink, and the channel measurement information within the second frequency range being determined from at least one of signals transmitted by the infrastructure equipment or another communications device in accordance with the first radio access technology or transmitted in accordance with at least one other radio access technology by storing, by the one or more communications devices, in a log the channel measurement information along with the estimated location where the channel measurement information is generated,
to receive, via the first frequency range, in response to the request from the one or more communications devices the channel measurement information regarding the second frequency range and the estimated location information where the channel measurement information was generated for the second frequency range, and
to store the channel measurement information with the estimated location of where the channel measurement information was generated in a data store for use in selecting one or more component carriers, from the one or more candidate carriers.

12. The infrastructure equipment as claimed in claim 11, wherein the controller is configured in combination with the transmitter and a receiver
to transmit an indication identifying a selected one or more component channels to the at least one communications device based upon a location of the one or more component channels for use in transmitting signals to the one or more communications devices via the second frequency range.

13. The infrastructure equipment as claimed in claim 11, wherein the channel measurement information includes information representative of measurements determined from signals received from either the first radio access technology or the at least one other radio access technology or the first and the at least one other radio access technology.

14. The infrastructure equipment as claimed in claim 11, wherein the channel measurement information for a candidate carrier includes information representative of measurements determined from signals received from the first radio access technology and the at least one other radio access technology and the controller is configured to combine measurement information determined for the first radio access technology with measurement information determined for the at least one other radio access technology to form a combined measurement information for the candidate carrier and to store the combined measurement information for the candidate carrier in the data store.

15. The infrastructure equipment as claimed in claim 11, wherein the channel measurement information comprise one or more channel state reports which are received from the communications devices on the up-link of the primary cell.

16. Circuitry for a communications device for transmitting data to or receiving data from a mobile communications network, the mobile communications network including infrastructure equipment, the infrastructure equipment providing a wireless access interface for transmitting signals to or receiving signals from the communications device, the circuitry comprising:
- a transmitter circuit configured to transmit the signals to the infrastructure equipment via the wireless access interface in accordance with a first radio access technology,
- a receiver circuit configured to receive the signals from the infrastructure equipment via the wireless access interface in accordance with the first radio access technology, and
- a controller circuit for controlling the transmitter and the receiver, wherein the wireless access interface provides a primary carrier within a first frequency range, which forms a primary cell providing a contiguous set of communications resources across the first frequency range, and the controller circuit is configured in combination with the receiver circuit and transmitter circuit
- to generate data representing an estimation of a location of the communications device,
- to detect signals received within one or more predefined candidate channels within a second frequency range which is different to and mutually exclusive from the first frequency range at the estimated location, each of the candidate channels in the second frequency range representing a minimum unit of communications resource, and the detected signals within the second frequency range being at least one of signals transmitted by the infrastructure equipment or another communications device in accordance with the first radio access technology or transmitted in accordance with at least one other radio access technology,
- to generate, for each of the one or more candidate channels, channel measurement information regarding the second frequency range from the signals detected within the candidate channels at the estimated location,
- to store in a log the channel measurement information along with the estimated location where the channel measurement information is generated, and
- to transmit, via the first frequency range, the channel measurement information regarding the second frequency range together with an indication of the estimated location where the channel measurement information is generated for each of the candidate channels to the infrastructure equipment.

* * * * *